April 27, 1965    J. C. NASH    3,179,977
MULTIPLE HINGED RAIL JOINT
Filed Feb. 3, 1964    3 Sheets-Sheet 1

INVENTOR.
JOHN CRANDON NASH
BY
William Frederick Nemat
ATTORNEY

April 27, 1965  J. C. NASH  3,179,977
MULTIPLE HINGED RAIL JOINT
Filed Feb. 3, 1964  3 Sheets-Sheet 2
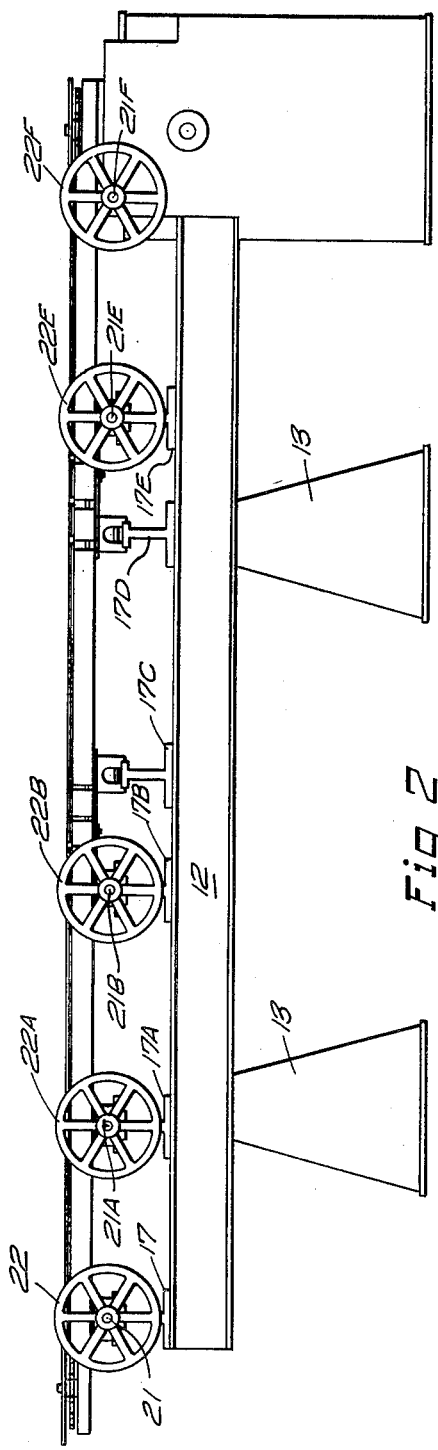
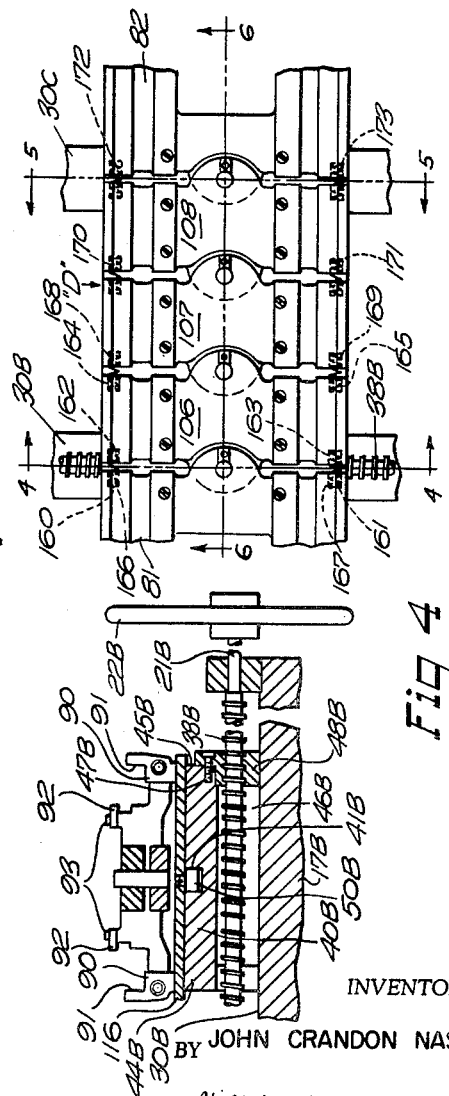
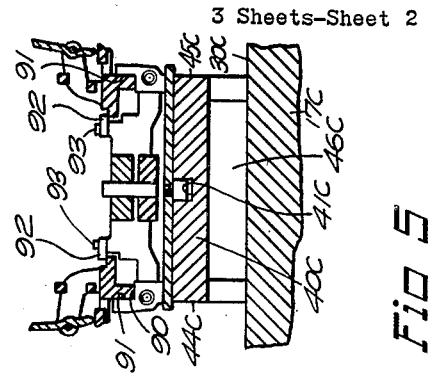
INVENTOR.
BY JOHN CRANDON NASH
William Frederick Werner
ATTORNEY April 27, 1965   J. C. NASH   3,179,977
MULTIPLE HINGED RAIL JOINT
Filed Feb. 3, 1964   3 Sheets-Sheet 3
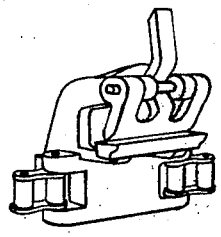
Fig 8
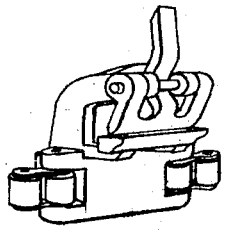
Fig 11
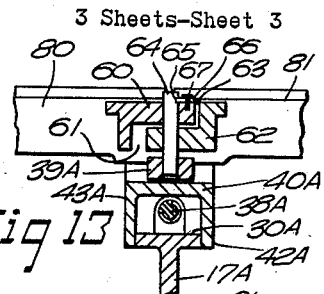
Fig 13
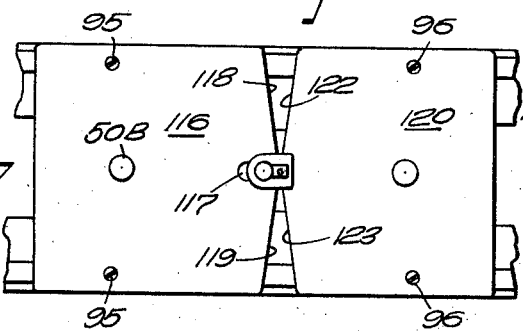
Fig 7
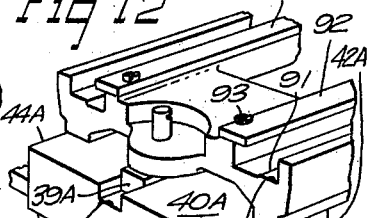
Fig 12
Fig 10
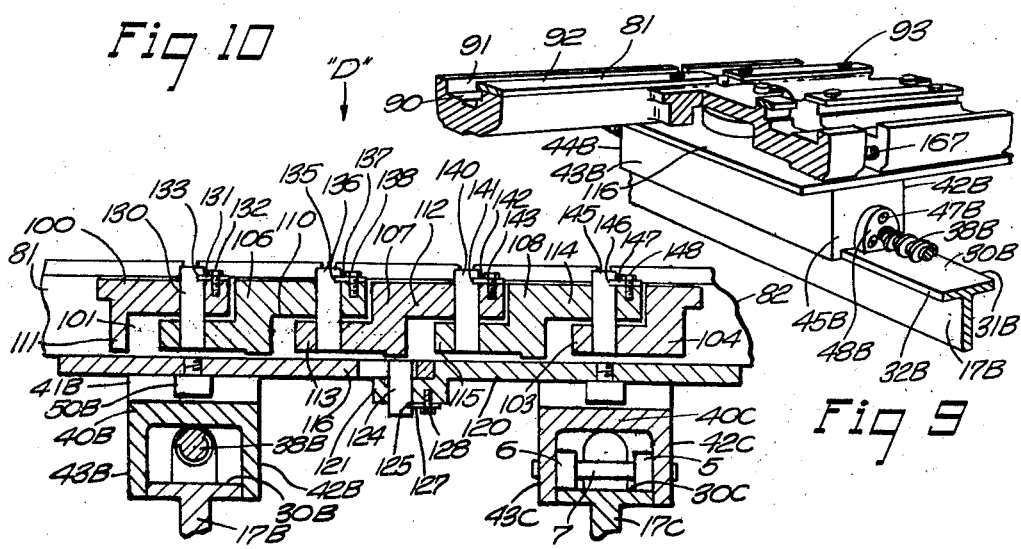
Fig 9
Fig 6
INVENTOR.
JOHN CRANDON NASH
BY
William Frederick Werner
ATTORNEY

United States Patent Office 3,179,977
Patented Apr. 27, 1965

3,179,977
MULTIPLE HINGED RAIL JOINT
John Crandon Nash, Providence, R.I., assignor to Marshall and Williams Corporation, Providence, R.I., a corporation of Rhode Island
Filed Feb. 3, 1964, Ser. No. 342,174
8 Claims. (Cl. 18—1)

This invention relates to multiple hinged rail joints and more particularly to a tentering machine for laterally stretching a web of thermoplastic film to increase the width of the web and to reduce the web thickness.

One of the objects of the present invention is to provide means whereby the companion guide rail tracks which support and guide the two sets of tenter clip chains may be simultaneously adjusted into smooth serpentine oppositely directed curves intermediate the opposite ends of the tentering machine.

Another object of the present invention is to provide improved structural means for pivotally connecting the portions of the guide rails which form the curved portions of the serpentine track.

And still another object of the present invention is to provide a guide rail in a tentering machine with a smooth reverse curve created by a plurality of straight sections of guide rail wherein abruptness of angle between straight sections is eliminated and severe stretching of the web of film at a break between rail sections is eliminated.

And still a further object of the present invention is to provide for a plurality of self adjusting guide rail sections constituting portions of the curved guide rail so that the spreading of the web will be uniform and gradual.

Still another object of the present invention is to avoid localized stretching of a film in a plastic state as the film travels through the tentering machine; the localized stretching being created by the tenter clips encountering bumps as the tenter clips pass from one guide rail section to an adjacent guide rail section in oppositely disposed pairs.

Other objects of the present invention will be pointed out in part and become apparent in part in the following specification and claims.

The present invention is an improvement over my copending application Serial No. 221,558 filed September 5, 1962 for Apparatus for Stretching Webs.

In the specification and claims the term web includes any type of web material such as cotton, wool, synthetic fibers, plastic film, aluminum foil, glossy paper, etc.

Referring to the drawings in which similar characters of reference indicate corresponding parts in all the figures:

FIGURE 2 is a right side elevational view of FIGURE 1.

FIGURE 3 is a top plan view of one of the self-adjusting multiple hinged rail joints on an enlarged scale over FIGURE 1.

FIGURE 4 is a fragmentary vertical cross sectional view taken on line 4—4 of FIGURE 3.

FIGURE 5 is a fragmentary vertical cross sectional view taken on line 5—5 of FIGURE 3 with the tenter clips added to the view.

FIGURE 6 is a fragmentary transverse vertical cross sectional view taken on line 6—6 of FIGURE 3.

FIGURE 7 is a fragmentary bottom plan view of two plates which support a multiple hinged rail joint.

FIGURE 8 is a perspective view of one of the several types of tenter clips used with the present self adjusting multiple hinged rail joint.

FIGURE 9 is a fragmentary perspective view of two adjacent self adjusting guide rail sections of a multiple hinged rail joint.

FIGURE 10 is a diagrammatic view illustrating the relative position the serpentine self adjusting multiple hinged rail joint sections take in relation to one another in forming a reverse curve.

FIGURE 11 is a perspective view of a modified form of tenter clip used with the present self adjusting multiple hinged rail joint.

FIGURE 12 is a fragmentary perspective view of a guide rail section pivotally attached to a saddle which is slidably mounted upon a cross member.

FIGURE 13 is a fragmentary cross sectional view taken on line 13—13 of FIGURE 1.

Figure 1:
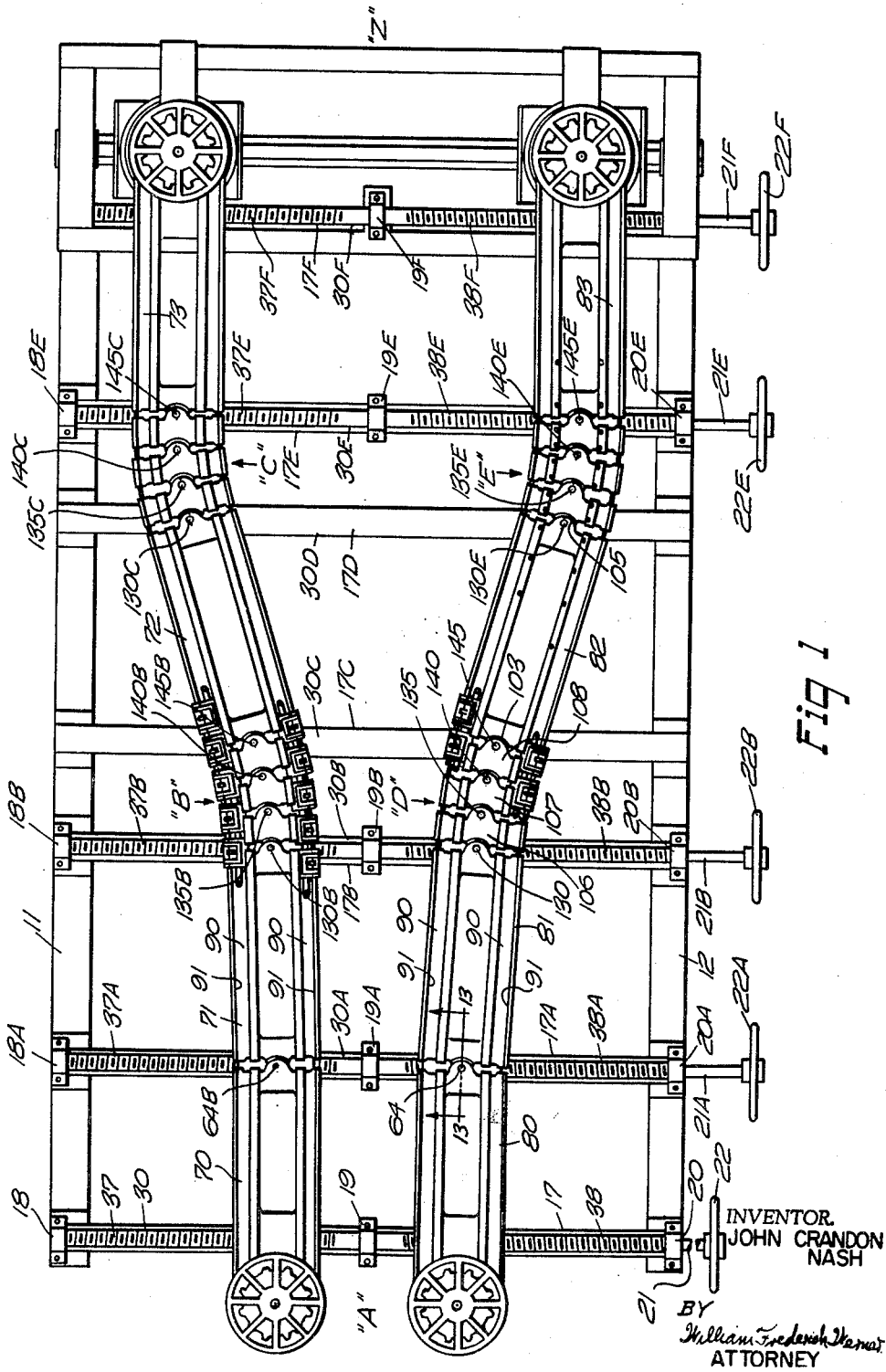
FIGURE 1 is a plan view of the apparatus for stretching webs laterally incorporating multiple hinged rail joints.

In proceeding with this invention, a tentering machine has been utilized but substantial structural changes have been made thereto.

The tentering machine consists (see FIGURES 1 and 2) of a left side frame 11 and a right side frame 12. A plurality of legs or standards 13 are fixed to the underside of left and right side frames 11 and 12, respectively, as by welding. A plurality of cross members 17, 17A, 17B, 17C, 17D, 17E, 17F, in the form of H beams, are fastened, as by welding, to the top surfaces of left side frame 11 and right side frame 12, respectively.

Each cross member 17, 17A, 17B, 17C, 17D, 17E, 17F, is machine finished to provide a track consisting of a top 30, 30A, 30B, 30C, 30D, 30E, 30F and opposite sides; for the opposite side see FIGURES 12 and 9, at 31A, 32A; 31B, 32B, respectively.

Cross members 17, 17A, 17B, 17E and 17F are provided with three bearings 18, 19, 20; 18A, 19A, 20A; 18B, 19B, 20B; 18E, 19E, 20E, and 18F, 19F, 20F, respectively, which are fastened thereto by means of bolts or by means of welding. A plurality of shafts 21, 21A, 21B, 21E, 21F are rotatively mounted, respectively, in bearings, 18, 19, 20; 18A, 19A, 20A; 18B, 19B, 20B; 18E, 19E, 20E; 18F, 19F, 20F. Hand wheels 22, 22A, 22B, 22E, 22F, are fastened to one end of shafts 21, 21A, 21B, 21E, 21F, respectively, for the manual rotation thereof. Shafts 21, 21A, 21B, 21E, 21F are provided, respectively, with right hand threads 37, 37A, 37B, 37E, 37F, and with left hand threads, respectively, 38, 38A, 38B, 38E, 38F.

A plurality of saddles are provided; one for each right hand screw thread 37, 37A, 37B, 37E, 37F and one for each left hand screw thread 38, 38A, 38B, 38E, 38F. FIGURE 4 illustrates a cross sectional view through a saddle and FIGURE 12 illustrates a guide rail section pivotally mounted to a saddle which is slidably mounted upon a cross member.

The saddles will carry the alphabetical designation of the cross member. The saddles comprise a body member 40 provided with a groove 41, side walls 42, 43, end walls 44, 45 and a hollow space 46. A block 39 is slidably mounted in groove 41.

Body member 40A (in FIGURE 12) is slidably mounted upon cross member 17A with end walls 44A, 45A, slidably engaging top 30A and with side walls 42A, 43A slidably engaging opposite sides 31A, 32A, respectively.

With reference to FIGURE 4 body member 40B is mounted upon cross member 17B and it will be seen that end wall 45B is provided with a threaded bushing 48B adapted to receive one of the threads, 38B of the shaft 21B. Bushing 48B is fastened to end wall 45B by means of screws 47B.

(In FIGURE 12 threads 38A engage bushing 48A.) Rotation of shaft 21B causes saddle 40B to slide upon cross member 17B. It will be understood that the saddle attached to the threaded portions of shafts 21, 21A, 21B, 21E and 21F are constructed in a like manner to function in the same way.

The saddle 40C illustrated in FIGURE 5 which is slidably mounted upon cross member 17C lacks the equivalent of threaded bushing 48B and a threaded shaft portion 38B, so that saddle 40C is free to slide upon cross member 17C under the influence of intermediate rail sections 72 and 82 depending upon its association with pintle 145 or 145B.

As shown in FIGURE 6, saddle 40C is provided with a set of rollers 5, 6 rotatively mounted upon a stub shaft 7 fixed in side walls 42C, 43C. Rollers 5, 6 engage top 30C to support saddle 40C upon cross member 17C and reduce the friction when saddle 40C slides upon cross member 17C. In like manner, a corresponding saddle engages cross member 17D.

FIGURE 1 illustrates a tentering machine having a web entering end at "A" and a web exiting end at "Z." The tentering machine is illustrated as comprising four pairs of straight rail sections of equal length, 70, 71, 72, 73 and 80, 81, 82, 83 and two multiple hinged rail sections of lesser length between straight rail section in each pair, generally indicated by arrows B, C, and D, E. It is to be understood that a larger number of straight rail sections and a greater or lesser number of multiple hinged rail sections may constitute a tentering machine.

In conventional manner (see FIGURES 12 and 13), the straight rail sections are pivotally connected. In FIGURE 13 straight rail section 80 is provided with an upper projection or tongue 60 and a lower recess 61. Straight rail section 81 is provided with a lower projection 62 and an upper recess 63 with the lower projection 62 located in lower recess 61 underlying tongue 60. A pintle 64 provided with a slot 65 is located in block 39A and pivotally connects tongue 60 with lower projection 62. A spline 66 fastened to tongue 60 by means of screw 67 engages slot 65 to hold pintle 64 in position. However, pintle 64 through the action of gravity could engage the bottom of groove 41A and still properly function as a hinge member between tongue 60 and lower projection 62.

Both the straight rail sections and the multiple hinged rail sections consist of a tenter clip track (see FIGURE 12) having a rail seat 90, a rail face 91 and a clip retaining member 92 fastened to the rail section by means of screws 93.

This invention is specifically directed to the multiple hinged rail joints B, C, D and E. Each joint B, C, D and E individually comprises multiple hinged rail sections. One of these multiple hinged rail joints will be described in structural detail. It is to be understood that the other multiple hinged rail joints are constructed in a like manner.

For purposes of description straight rail section 80 will be termed the entering rail 80, straight rail section 81 will be termed intermediate rail section 81, intermediate rail section 82 will be termed second intermediate rail section 82, and straight rail section 83 will be termed delivery rail section 83.

With reference to FIGURE 6 intermediate rail section 81 is provided with an upper projection or tongue 100 and a lower recess 101 forming the tongue 100 of a hinge. Intermediate rail section 82 is provided with an upper recess 103 and a lower projection 104 on one end and a tongue 105 on the opposite end.

The drawings illustrate three multiple hinged rail sections forming a joint (see FIGURES 1, 3, 4 and 6) for example 106, 107, 108 at arrow D, which may be called "a train" because the number of sections may be increased or decreased. Each multiple section is provided with a tongue on one end and a lower projection on the other end. Multiple section 106 is provided with tongue 110 and lower projection 111. Multiple section 107 is provided with tongue 112 and lower projection 113. Multiple section 108 is provided with tongue 114 and lower projection 115.

Referring to FIGURES 2, 3, 4, 5, 6, 7 and 9, a platform 116 is fastened to intermediate rail 81, as by welding or by means of screws 95, and projects beyond the end of intermediate rail 81 a distance sufficient to support multiple section 106 and one half of multiple section 107. Platform 116 is provided with an elongated orifice 117 and two cut-back surfaces 118 and 119 (see FIGURE 7). A second platform 120 is fastened to the underside of intermediate rail 82 at one end, by means of welding or by means of screws 96, and projects beyond the end of intermediate rail 82 a distance sufficient to support multiple joint 108 and the end of platform 116. Second platform 120 is provided with an integrally formed dependent projection 121 and two cut-back surfaces 122, 123. A pivot pin 124 provided with a slot 125 is fastened in dependent projection 121 and extends into elongated orifice 117 to pivotally connect platform 116 with platform 120 and thereby pivotally connect one end of intermediate rail section 82 with an end of intermediate rail 81. Pivot pin is fastened in dependent projection 121 by means of a spline 127 located in slot 125. Spline 127 is fastened to dependent projection 121 by means of screw 128. The respective cut-back surfaces 118, 122 and 119, 123 may be adapted to limit the extent of the pivotal movement between platforms 116 and 120.

Pintle 130 (see FIGURE 6) provided with a slot 133 pivotally connects tongue 100 with lower projection 111 by passing through orifices in tongue 100 and lower projection 111 adapted for that purpose. A spline 131 fastened to tongue 100 my means of screw 132 engages slot 133 to hold pintle 130 in position. However, pintle 130 through the action of gravity could engage platform 116 and still properly function as a hinge member between tongue 100 and lower projection 111.

Similarly, pintle 135 provided with a slot 136 pivotally connects tongue 110 with lower projection 113. Spline 137 fastened to tongue 110 by means of screw 138 engages slot 136 to retain pintle 135 in position. Pintle 140 provided with a slot 141 pivotally connects tongue 112 with lower projection 115. Spline 142 fastened to tongue 112 by means of screw 143 engages slot 141 to retain pintle 140 in position. Pintle 145 provided with a slot 146 pivotally connects tongue 114 with lower projection 104. Spline 147 fastened to tongue 114 by means of screw 148 engages slot 146 to retain pintle 145 in position.

A pivot pin 50B is fastened to platform 116, as by means of screw threads (see FIGURE 4). Pivot pin 50B engages slot 41B in saddle 40B. Platform 116 is supported upon saddle 40B. Rotaton of hand wheel 22B rotates shaft 21B and through left hand screw threads 38B, and bushing 48B engaging with screw threads 38B, slides saddle 40B back and forth across the top 30B of cross member 17B and through pivot pin 50B and slot 41B platform 116 is moved back and forth thereby pivoting intermediate rail 81 in relation to intermediate rail 82 and thereby pivoting multiple sections 106, 107 and 108 between pintles 130 and 145.

In like manner multiple hinged rail section B is pivotally connected by means of pintles 130B, 135B, 140B and 145B. Multiple hinged rail section C is pivotally connected by means of pintles 130C, 135C, 140C and 145C. Multiple hinged rail section E is pivotally connected by means of pintles 130E, 135 E, 140E and 145E.

One of the unique constructions features of the present invention is the provision of resilient means between the ends of the multiple hinge rail sections 106, 107, 108.

Intermediate rail 81 (see FIGURES 1, 3 and 9) is provided with oppositely located bores 160 and 161 in one end. Multiple hinge rail section 106 is provided with oppositely located bores 162, 163 on one end aligned, respectively, with bores 160, 161. On the other end multiple hinge rail section 106 is provided with oppositely located bores 164, 165. A coil spring 166 is located in bores 160 and 162. A coil spring 167 is located in bores 161 and 163. In the same manner of construction coil springs 168, 169 are interposed between multiple hinge sections 106, 107. Coil springs 170, 171 are interposed between multiple hinge sections 107, 108 and coil springs 172, 173 are interposed between multiple hinged sections 108 and intermediate rail 82.

In operation the distance between entering rails 70, 80 and the distance between delivery rail sections 73, 83 will be predetermined. Hand wheels 22 thru 22F will be rotated in succession to adjust the respective rail sections. The rotation of hand wheel 22B will adjust pintles 130, 130B in relation to each other and in relation to pintles 64, 64B, respectively. The rotation of hand wheel 22E will adjust pintles 145E and 145C in relation to each other and in relation to pintles 130, 130B, respectively.

Pintles 145, 145B are respectively, connected to saddles slidably mounted upon cross member 17C. Pintles 130C and 130E are respectively, connected to saddles slidably mounted upon cross member 17D.

The positioning of pintles 130, 130B and 145C, 145E, will cause pintles 145, 145B and 130E, 130C to automatically slide the respective saddles along cross members 30C and 30D, respectively. In this manner pintles 135 and 140 will automatically align with pintles 130, 145. Pintles 135B, 140B will automatically align with pintles 130B and 145B. Pintles 135E and 140E will automatically align with pintles 130E, 145E. Pintles 135C, 140C will automatically align with pintles 130C and 145C.

To insure that the automatic adjustment of pintles 135, 140 is uniform in relation to pintles 130, 145, springs 166, 167, 168, 169, 170, 171, 172, 173 distribute the pivotal stress between the multiple hinged rail sections 106, 107, 108 to produce a smooth curve between intermediate rail sections 81, 82. In the same way, the springs located between the multiple hinged rail sections B, C and E distribute the pivotal stress between the, respective, multiple hinged rail sections to produce a smooth curve between the intermediate rail sections.

The tenter clips illustrated in FIGURES 8 and 11 form chains well known to the art, for travel in the tenter clip track having rail seat 90 and rail face 91. These tenter clips show but do not limit the type of web gripping means used with the present multiple hinged rail joint.

Having shown and described a preferred embodiment of the present invention by way of example, it should be realized that structural changes could be made and other examples given without departing from either the spirit or scope of this invention.

What I claim is:

1. A multiple hinged rail joint comprising a plurality of cross members, a plurality of saddles, at least one saddle for each cross member, means slidably mounting a saddle to a cross member, three main guide rail sections, a first and second plate hinged together, means fastening said first plate to one of said three main guide rail sections and means fastening the second plate to the second of said three main guide rail sections, a third and fourth plate hinged together, means fastening said third plate to said second of said three main guide rail sections and means fastening said fourth plate to the third of said three main guide rail sections to pivotally hinge and support said three main guide rail sections together, means pivotally and slidably connecting said first plate to one of said plurality of saddles, whereby said saddle supports said plate, means pivotally and slidably connecting said fourth plate to one of said plurality of saddles, whereby said saddle supports said fourth plate, means pivotally and slidingly connecting said second plate to one of said plurality of saddles whereby said saddle supports said second plate and means pivotally and slidingly connecting said third plate to one of said plurality of saddles whereby said saddle supports said third plate, a first group of a plurality of shorter guide rail sections pivotally connected to each other and to said first and second guide rail sections and being supported, respectively, on said first and second plate, a second group of a plurality of shorter guide rail sections pivotally connected to each other and to said second and third guide rail sections, a plurality of resilient members interposed between each guide rail section on opposite side of the pivot means, and means for slidably adjusting said first and third guide rail sections upon the respective saddles to provide a curved track between said first and second guide rail sections and a curve reversed to said first mentioned curve between said second and third guide rail sections, said resilient means providing equal angular relations between adjacent guide rail sections.

2. A multiple hinged rail joint comprising a plurality of cross members, a shaft having a right hand thread and a left hand thread, means rotatively mounting said shaft to one of said plurality of cross members, a plurality of saddles, two for each cross member, means attaching one of said plurality of saddles to said right hand thread and means attaching one of said plurality of saddles to said left hand thread, whereby said two saddles are slidably mounted upon a cross member toward and away from each other, a first straight rail section, a first plate fastened to said first straight rail section, means pivotally connecting said first plate to said saddle attached to said right hand thread, a second straight rail section, a second plate fastened to said second straight rail section, means pivotally connecting said first plate with said second plate, means pivotally connecting said second plate to one of said plurality of saddles, a first multiple hinged rail joint consisting of a plurality of short rail sections pivotally connected together and pivotally connected on opposite ends to said first straight rail section and to said second straight rail section, said first and second plate underlying and supporting said plurality of short rail sections, and resilient means interposed between each of said plurality of short rail sections and between said short rail sections and said first and second straight rail sections, a third straight rail section, a third plate fastened to said third straight rail section, means pivotally connecting said third plate to said saddle attached to said left hand thread, a fourth straight rail section, a fourth plate fastened to said fourth straight rail section, means pivotally connecting said third plate with said fourth plate, means pivotally connecting said fourth plate to one of said plurality of saddles, a second multiple hinged rail joint consisting of a plurality of short rail sections pivotally connected together and pivotally connected on opposite ends to said third straight rail section and to said fourth straight rail section, said third and fourth plate underlying and supporting said last mentioned plurality of short rail sections, and resilient means interposed between each of said plurality of short rail sections and between said short rail sections and said third and fourth straight rail sections, whereby rotation of said shaft causes said first and second multiple hinged rail joint to form equal and opposite curved rail sections having equal angles between each short rail section.

3. A multiple sectioned rail joint construction comprising two oppositely curved portions, each portion comprising an end main rail section and an intermediate main rail section, means joined to said end rail section for moving said end rail section transversely of said rail, means joined to said intermediate rail section for carrying said intermediate rail section transversely of said rail, a first plate fixedly joined to said end rail section, a second plate fixedly joined to said intermediate rail section, said first and second plates being pivotally and slidably connected at least one comparatively short rail section pivotally joined to said end main rail section and further pivotally jointed to said intermediate main rail section, said first and second plates lending support to said at least one comparatively short rail section, resilient means interposed between said end main rail section and said at least one short rail section and between said at least one short rail section and said intermediate rail section for urging said sections into proper alignment whereby when the end main rail sections of said portions are transversely disposed the two portions form a smooth reverse curve.

4. A multiple sectioned rail joint construction comprising two oppositely curved portions, each portion comprising an end main rail section and an intermediate main rail section, means joined to said end rail section for moving said end rail section transversely of said rail, means joined to said intermediate rail section for carrying said intermediate rail section transversely of said rail, a first plate fixedly joined to said end rail section, a second plate fixedly joined to said intermediate rail section, said first and second plates being pivotally and slidably connected, a plurality of an odd number of comparatively short rail sections pivotally joined to each other to form a train having two ends, said train being pivotally joined at one end to said end main rail section and being pivotally joined at the other end to said intermediate main rail section, said first and second plate lending support to said comparatively short rail sections, resilient means interposed between each comparatively short rail section and its adjacent short section and between said one train end and said end main rail section and between said other train end and said intermediate main rail section for urging said sections into proper alignment whereby when the end main rail sections of said portions are transversely disposed the two portions form a smooth reverse curve.

5. A combination according to claim 4 wherein said resilient means are a plurality of coil springs.

6. In a tentering machine; two spaced adjacent similar rail constructions, each rail construction comprising two oppositely curved portions oppositely oriented from the adjacent corresponding curved portions of the adjacent rail construction, each portion comprising an end main rail section and an intermediate main rail section, a threaded shaft joining each pair of adjacent oppositely oriented corresponding end main rail sections and adapted to move said corresponding sections together and apart equal distances as said shaft is rotated in one direction and then in the opposite direction, thus controlling the distance between said corresponding sections, means joined to said intermediate main rail section for carrying said intermediate section transversely of said rail, a first plate fixedly joined to the bottom of said end rail section, a second plate fixedly joined to the bottom of said intermediate rail section, said first and second plates being pivotally and slidably connected, a plurality of comparatively short rail sections pivotally joined to each other to form a train having two ends, said train being pivotally joined at one end to said end main rail section and being pivotally joined at the other end to said intermediate main rail section, said first and second plates lending support to said comparatively short rail sections, a plurality of coil springs interposed between each comparatively short rail section and its adjacent short section and between said one train end and said end main rail section and between said other train end and said intermediate main rail section for urging said sections into proper alignment, whereby when one pair of adjacent corresponding end main rail sections are oriented closer to each other than the other pair of adjacent corresponding end main rail sections the two rail constructions will have two similar but oppositely oriented smooth reverse curves.

7. In a tentering machine; two spaced adjacent similar rail constructions, each rail construction comprising two oppositely curved portions oppositely oriented from the adjacent corresponding curved portions of the adjacent rail construction, each portion comprising an end main rail section pivotally and slidably mounted on a saddle and an intermediate main rail section pivotally and slidably mounted on a saddle, a threaded shaft joining the saddle of each pair of adjacent oppositely oriented corresponding end main rail sections and adapted to move said saddles together and apart equal distances as said shaft is rotated in one direction and then in the opposite direction, thus controlling the distance between said corresponding end main rail sections, said saddle of said intermediate main rail section being slidably mounted on a beam for transverse movement of said rail, a first plate fixedly joined to the bottom of said end rail section, a second plate fixedly joined to the bottom of said intermediate rail section, said first and second plates being pivotally and slidably connected, a plurality of comparatively short rail sections pivotally joined to each other to form a train having two ends, said train being pivotally joined at one end to said end main rail section and being pivotally joined at the other end to said intermediate main rail section, said first and second plates lending support to said comparatively short rail sections, spring means interposed between each comparatively short rail section and its adjacent short section and between said one train end and said end main rail section and between said other train end and said intermediate main rail section for urging said sections into proper alignment, whereby when one pair of adjacent corresponding end main rail sections are oriented closer to each other than the other pair of adjacent corresponding end main rail sections the two rail constructions will have two similar but oppositely oriented smooth reverse curves.

8. A multiple sectioned rail joint construction comprising two oppositely curved portions, each portion comprising an end main rail section and an intermediate main rail section, means joined to said end rail section for moving said end rail section transversely of said rail, means joined to said intermediate rail section for carrying said intermediate rail section transversely of said rail, a first plate fixedly joined to said end rail section, a second plate fixedly joined to said intermediate rail section, said first and second plates being pivotally and slidably connected, a plurality of an odd number of comparatively short rail sections pivotally joined to each other to form a train having two ends, said train being pivotally joined at one end to said end main rail section and being pivotally joined at the other end to said intermediate main rail section, said first and second plates lending support to said train, two oppositely located coil springs interposed between each comparatively short rail section and its adjacent short section and between said one train end and said end main rail section and between said other train end and said intermediate main rail section for urging said sections into proper alignment whereby when the end main rail sections of said portions are transversely disposed the two portions form a smooth reverse curve.

References Cited by the Examiner
UNITED STATES PATENTS
3,066,377  12/62  Waterman _____ 18—1
3,078,504  2/63   Kappehele _____ 18—1

WILLIAM J. STEPHENSON, *Primary Examiner.*